United States Patent
Balser et al.

(10) Patent No.: US 7,726,733 B2
(45) Date of Patent: Jun. 1, 2010

(54) REVERSIBLE SAFETY PADDING OR PLATE

(75) Inventors: Werner Balser, Hamburg (DE); Sylvain Langlet, Goincourt (FR); Thierry Hondier, Servaville-Salmonvile (FR); Gilles Garret, Rouen (FR); Pierre Untersinger, Piuneret (FR); Nicolas Eon, Bray (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/775,647

(22) Filed: Jul. 10, 2007

(65) Prior Publication Data

US 2007/0252368 A1 Nov. 1, 2007

Related U.S. Application Data

(63) Continuation of application No. PCT/EP2006/000017, filed on Jan. 3, 2006.

(30) Foreign Application Priority Data

Jan. 18, 2005 (DE) .................. 10 2005 002 464

(51) Int. Cl.
*B60N 2/427* (2006.01)
*B60R 21/01* (2006.01)

(52) U.S. Cl. .............. 297/216.1; 297/216.13; 280/730.2; 280/743.1

(58) Field of Classification Search .......... 297/216.1, 297/216.13; 280/730.2, 743.1
See application file for complete search history.

(56) References Cited

U.S. PATENT DOCUMENTS

| | | | | |
|---|---|---|---|---|
| 3,173,722 | A * | 3/1965 | Carbonetti ............. | 297/423.17 |
| 3,623,768 | A * | 11/1971 | Capener et al. ............. | 297/330 |
| 3,684,309 | A * | 8/1972 | Uchiyamada et al. ....... | 280/735 |
| 5,505,487 | A * | 4/1996 | Brown et al. ............. | 280/730.1 |
| 5,531,470 | A * | 7/1996 | Townsend ................ | 280/730.2 |
| 5,695,242 | A * | 12/1997 | Brantman et al. ........ | 297/216.1 |
| 5,730,458 | A * | 3/1998 | Byon ....................... | 280/730.2 |
| 5,826,938 | A * | 10/1998 | Yanase et al. .......... | 297/216.13 |
| 5,860,673 | A * | 1/1999 | Hasegawa et al. ........ | 280/730.2 |
| 5,927,749 | A | 7/1999 | Homier et al. | |
| 6,033,017 | A * | 3/2000 | Elqadah et al. .......... | 297/216.1 |
| 6,237,991 | B1 | 5/2001 | Weber | |
| 6,386,577 | B1 * | 5/2002 | Kan et al. ................ | 280/730.2 |
| 6,568,754 | B1 * | 5/2003 | Norton et al. .......... | 297/216.12 |
| 6,623,054 | B1 * | 9/2003 | Palmquist ................ | 293/48 |
| 6,857,495 | B2 * | 2/2005 | Sawa .......................... | 180/274 |
| 7,104,592 | B2 * | 9/2006 | Song ..................... | 296/187.12 |
| 2005/0006933 | A1 * | 1/2005 | Bargheer et al. ....... | 297/216.13 |

FOREIGN PATENT DOCUMENTS

| | | |
|---|---|---|
| DE | 4032381 A | 4/1992 |
| DE | 19952777 | 11/1999 |

(Continued)

*Primary Examiner*—Joseph F Edell
(74) *Attorney, Agent, or Firm*—Brinks Hofer Gilson & Lione

(57) ABSTRACT

The invention relates to a safety apparatus in a motor vehicle having a sensor device in communication with an evaluation unit within which sensor data are evaluated. The evaluation unit is in communication with at least one drive device that can move at least one energy-absorbing element from a rest position to a working position next to the seat or next to an occupant and back again.

19 Claims, 4 Drawing Sheets

FOREIGN PATENT DOCUMENTS

| | | |
|---|---|---|
| DE | 10038719 | 8/2000 |
| DE | 10043290 | 9/2000 |
| DE | 10057151 A1 | 6/2001 |
| EP | 470413 A1 | 2/1992 |
| EP | 913294 A2 | 6/1999 |
| JP | 2006-151111 A * | 6/2006 |
| WO | WO2004/062962 A1 | 7/2004 |

* cited by examiner

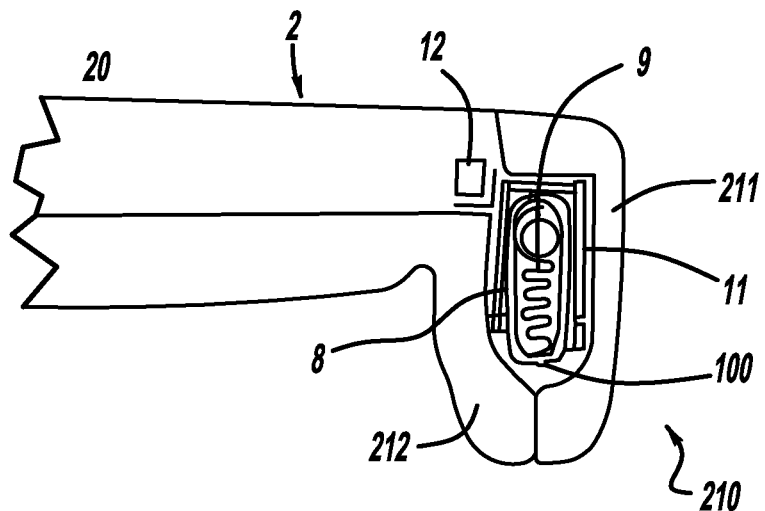
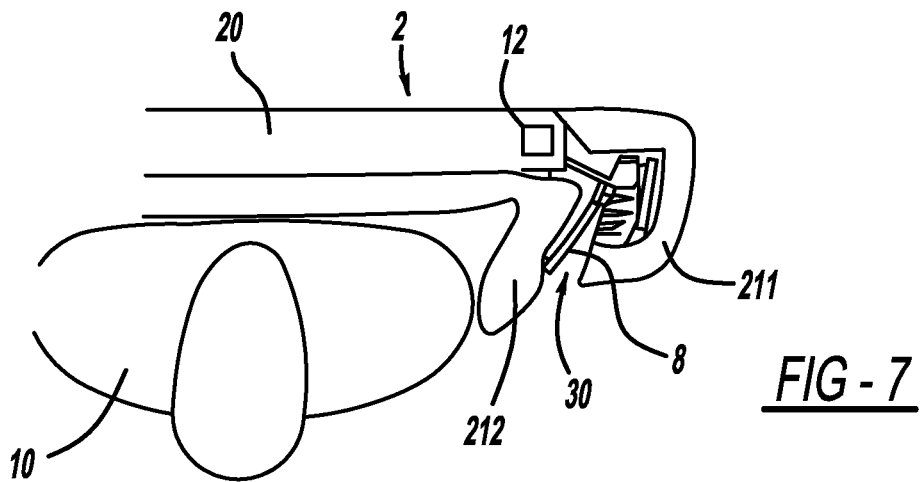
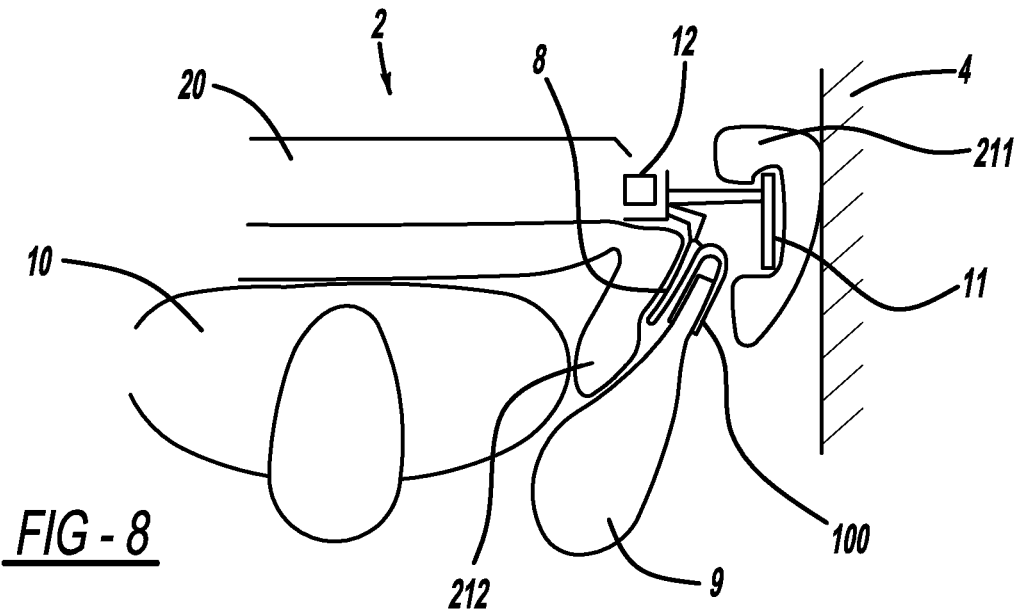

REVERSIBLE SAFETY PADDING OR PLATE

CROSS REFERENCE TO PRIOR APPLICATIONS

This application claims priority to PCT/EP2006/000017, filed 3 Jan. 2006, which in turn claimed priority to DE 10 2005 002 464.5, filed 18 Jan. 2005.

BACKGROUND OF THE INVENTION

The invention relates to a safety arrangement in a motor vehicle, the safety arrangement comprising a vehicle seat and a sensor device, which is connected to an evaluation unit which receives and processes data, including data from the sensor device.

A safety device that reduces the risk of injuries for a vehicle occupant in the event of a side impact is disclosed in WO 2004/062962 A1. A force-applying device, which exercises a force toward the center of gravity of the vehicle occupant in the event of a side impact, is situated within the seat cushion. The occupant is thereby moved away, upwards and inwards, from a penetrating vehicle or object during a side impact.

It is furthermore known from the prior art that, when predefined limits are exceeded, safety belts are may be pretensioned and/or seats moved into a position that accident technology deems favorable.

The problem addressed by the present invention is to improve the safety of vehicle occupants.

SUMMARY OF THE INVENTION

A safety arrangement in a motor vehicle comprises a vehicle seat and a sensor device which is connected to an evaluation unit which evaluates sensor data. The evaluation unit is in communication with at least one drive device that can move at least one coupling element, an energy-absorbing element for example, from a rest position into a working position next to the seat or occupant and back again. The reversible configuration of the energy-absorbing element makes it possible to move a coupling element laterally next to a vehicle occupant, especially near the pelvic region of the occupant, prior to an accident, especially a side impact. This provides optimum lateral support of the occupant by engaging the occupant with the seat, so that the occupant moves together with the seat during a side impact and does not bounce against a side structure because of the occupant's inertia. In an energy-absorbing embodiment of the coupling element, intrusion energy is converted during a side impact or rollover so that the energy load of the vehicle occupant is reduced.

The coupling element is advantageously arranged within the vehicle seat in its rest position as part of the seat's configuration, e.g., within the seat cushion or seat upholstery. The coupling element may thus be located in the seat cushion and/or in the backrest. Since the coupling element emerges from the backrest or from the seat cushion, the pelvic region of the vehicle occupant in particular is laterally supported and protected. The emerged coupling element can be retracted if a side impact or other accident does not occur, preferably with limited or no damage to the vehicle seat or interior.

The coupling element can also be configured to move within the seat and displace the seat upholstery toward the occupant. The occupant can thereby be relocated away from the area of potential danger as a precaution, with the coupling element remaining coupled to or clamped into the seat. By configuring a reversible coupling element in this fashion, it is possible to reduce the limits for the data detected by the sensor for activating the energy-absorbing elements and to introduce measures to protect the occupant when the probability of an accident is lower without triggering irreversible deployment of safety devices.

To effectively engage the seat with the entire vehicle, the energy-absorbing element can be arranged to engage a side structure of the vehicle, especially up to the door or to the center console of the vehicle.

In one embodiment of the invention, the energy-absorbing element is arranged in a seat cushion and moves in the vertical direction, namely upwards. Alternatively, it can move toward the side structure of the vehicle in the horizontal direction. It is likewise provided that the coupling element or the energy-absorbing element can move forwards from the backrest into the working position to protect the vehicle occupant laterally. To this end, the coupling element can be configured as a support plate, which is preferably coupled to energy storage devices or energy conversion devices. Springs or gas dampers, for example, can be provided as energy storage devices, and deformable bodies or viscous clutches, which convert kinetic energy into deformation energy or thermal energy, can be provided as energy conversion devices.

In another embodiment of the invention, an airbag is arranged in the seat cushion or in the backrest and unfolds between the side structure of the vehicle and the seat user when a sensor senses an accident or when sensor data exceed predefined limits.

The coupling element is preferably mounted on the seat frame so that an adjustment of the inclination of the backrest or seat cushion or seat height does not result in any disadvantages when deploying the safety-related devices with respect to the vehicle occupant. Such configuration promotes favorable assignment of the energy-absorbing elements to the body region of the vehicle occupant to be protected.

The sensor is preferably configured as a radar sensor for detecting an impending impact, wherein the evaluation unit evaluates the sensor data together with other data to determine probability of an accident.

A reversibly operable electric motor, which permits displacement motion into the working position and back into the rest position, is provided as a drive device for the energy-absorbing element. Alternatively, it is possible to assign two electric motors, each of which can be driven in only one direction, to the element. Alternatively, it is possible to configure the coupling element as a spring, which is coupled to an electric motor, pretensioned in the rest position, and unlocked to move the element into a working position.

To effect a reversible movement, an electric motor can again actuate the spring (by compressing or tensing) and return the energy-absorbing element into the rest position.

BRIEF DESCRIPTION OF THE DRAWINGS

The accompanying drawings incorporated in and forming part of the specification illustrate several aspects of the invention, and together with the description serve to explain the principals of the invention. In the drawings:

FIG. 6 is a sectioned view through a backrest;

FIG. 7 is another sectional view through a backrest showing an energy-absorbing element in alert mode;

FIG. 8 is another sectional view through a backrest shown, showing an energy-absorbing element in the deployed position.

DETAILED DESCRIPTION OF THE INVENTION

The following description of the embodiments of the invention is merely descriptive in nature and is in no way intended to limit the invention or its applications or uses.

Figure 1:
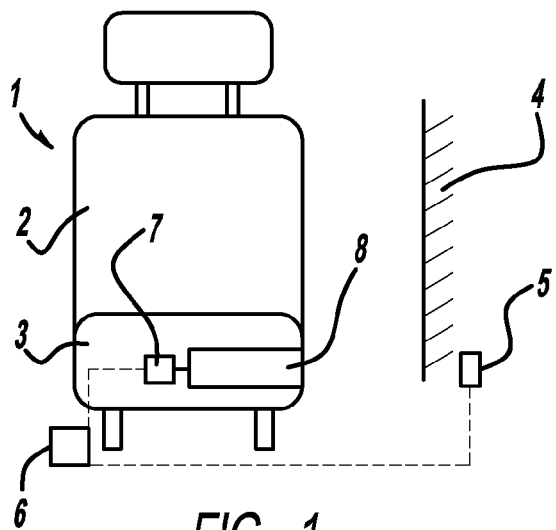
FIG. 1 is a schematic representation of a vehicle seat in the rest position.
Figure 2:
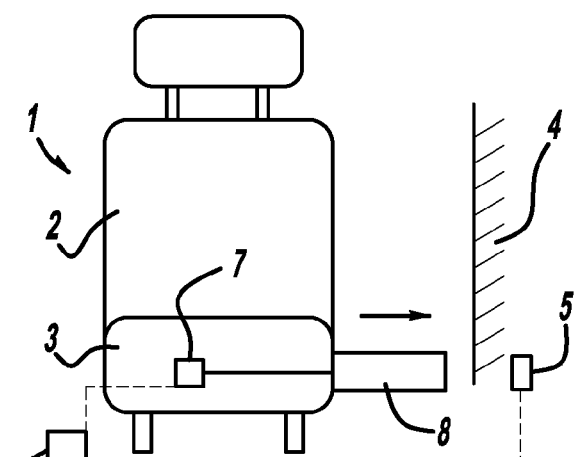
FIG. 2 is a schematic representation of a vehicle seat with the energy-absorbing element in the working position.

FIG. 1 depicts a vehicle seat 1, which comprises a backrest 2 and a seat cushion 3. The seat is fastened to a body of a vehicle, which is not illustrated in detail but which comprises a side structure 4, for example, a vehicle door. A sensor 5 is in communication with an evaluation unit 6, which is in communication with a drive device 7. In one embodiment, drive device 7 is a reversible electric motor. The sensor 5 is arranged in the side structure 4 to detect an impending accident. If an impending side impact is sensed, an appropriate signal is transmitted, via the evaluation unit 6, to the drive device 7, which then drives out, toward the side structure 4 perpendicular to the direction of vehicle travel, the coupling element 8 arranged in the seat cushion 3, said coupling element possibly being an energy-absorbing element. Such a state is depicted in FIG. 2.

Figure 3:
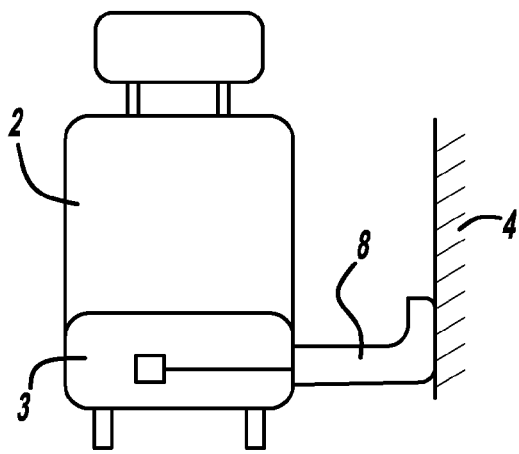
FIG. 3 is a schematic representation of a variant of a vehicle seat showing the energy absorbing element in the working position.

To this end, the coupling element 8 is arranged inside the seat cushion 3 and moves next to the seat 1 between said seat and the side structure 4. In the variant as per FIG. 2, the coupling element 8 does not reach the side structure 4. By appropriately dimensioning the coupling element 8 and the configuration of the vehicle interior, the coupling element 8 may extend up to the side structure 4 and become elastically deformed, if necessary, as illustrated in FIG. 3. If a side impact or accident doesn't occur, the evaluation unit 6 transmits a signal to the drive device 7 and the coupling element 8 can again be moved back into the seat cushion 3 perpendicular to the direction of vehicle travel and essentially parallel to the plane of motion.

Figure 4:
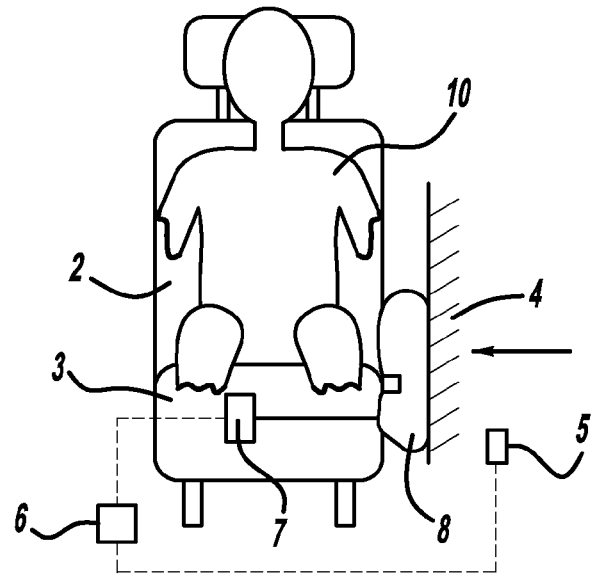
FIG. 4 is a schematic representation showing an occupant and energy-absorbing element deployed during a side impact.

If an accident indeed occurs in which the side structure 4, for example, moves toward the vehicle occupant 10, as indicated in FIG. 4, the energy-absorbing element 8 will move toward the vehicle occupant and convert intrusion energy into deformation energy.

Referring also to FIGS. 5-9, two alternative embodiments of the coupling element 8 in accordance with the present invention are provided. In particular, the coupling element 8 is configured in such a manner that, in the event of a side impact or even prior to a side impact, the deformation of at least parts of the seat 1, such as at least parts of the backrest 2 or of the seat cushion 3, will occur to couple the occupant 10 and move the occupant 10 away from the side structure 4. In the embodiments shown, the seat cushion 3 or backrest 2 may deform in such a manner so as to relocate the vehicle occupant 10 inwards, or to prevent the occupant from moving towards the side structure 4 of the vehicle in the event of impact.

In the driven-out state, coupling element 8 is locked. In one embodiment, coupling element 8 is secured by blocking the drive device 7. Coupling element 8 can also be fixed stationary to the seat 1 by a separate locking mechanism.

Figure 5:
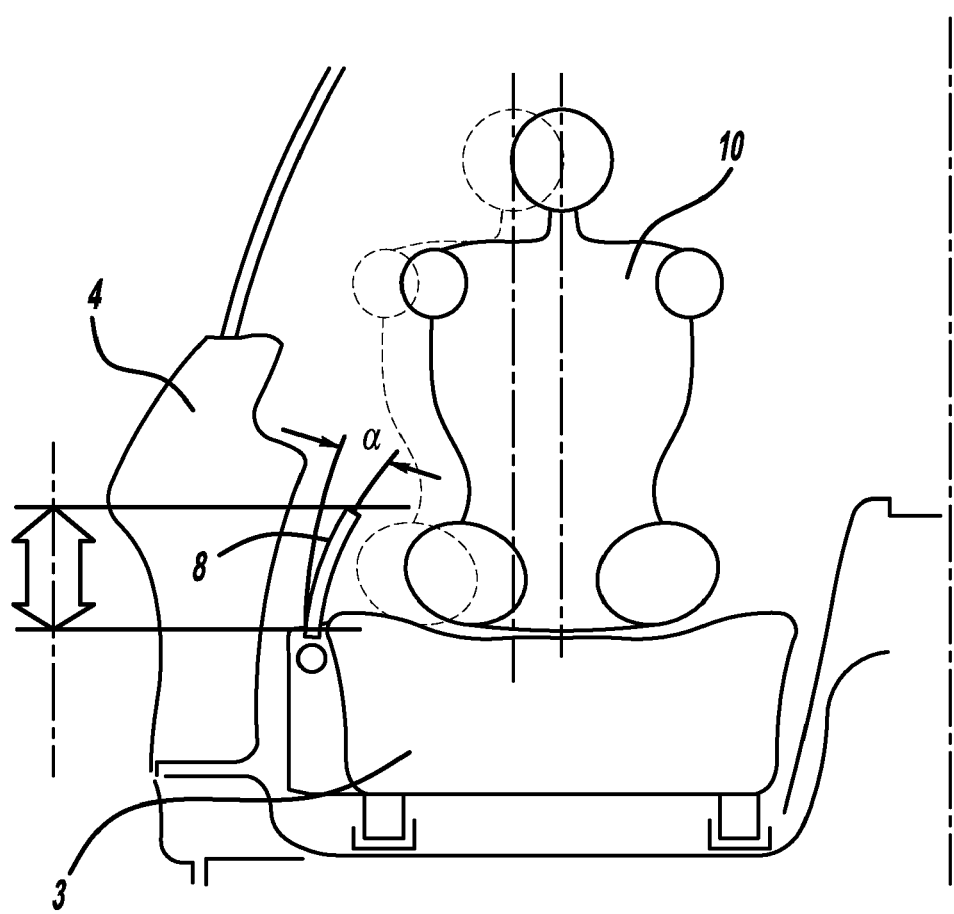
FIG. 5 is a schematic representation of an alternative configuration of an energy-absorbing element.

FIG. 5 depicts a variant of the invention in which coupling element 8 is a support plate 8 which may couple with occupant 10 and which maybe configured to absorb energy. Coupling element 8 is configured to travel out of a rest position into a depicted working position next to the seat cushion 3. The travel path is configured to assure engagement with a pelvic region of the vehicle user 10 in the event of impact. When an object or a vehicle penetrates laterally, the support plate serving as coupling element 8 moves toward the vehicle occupant 10. The support plate serving as coupling element 8 may be deflected or deformed along an energy-absorbing path b. To this end, the support plate serving as coupling element 8 is coupled to energy-converting or energy-storing devices, like springs or deformable bodies, so that the energy introduced into the vehicle structure is not transmitted to the vehicle occupant 10. In the rest position, which is not illustrated, the support plate serving as coupling element 8 is located next to the seat cushion 3 underneath the seat surface. The support plate serving as coupling element 8 can pivot or shift. The support plate serving as coupling element 8 is advantageously fastened to the frame of seat 1 so that the same geometric association of the coupling element 8 with the pelvic region of the vehicle occupant is ensured for different seat positions. In another embodiment (not shown), the support plate serving as the coupling element 8 can be arranged next to or in the backrest 2. Fixing the coupling element 8 apparatus to the seat frame addresses the problem of geometrically associating the coupling element 8 to the vehicle occupant 10 independently of the seat position and reduces or eliminates the need for expensive mechanical design or extensive configuration of the energy-absorbing elements. A reversible configuration by means of an appropriate drive device 7 permits favorable engagement of the occupant with the vehicle seat 1 prior to impact, with the precautionary measures being reversible if an accident does not occur.

FIGS. 6 to 9 depict a variant of the invention in which the coupling element 8 is arranged within the backrest 2. FIG. 6 depicts a sectioned view of a part of the backrest 2, which is built of several parts. A multipiece backrest cheek 210 comprising an external portion 211 and an internal portion 212 is arranged on a stationary backrest portion 20. The external portion 211 faces the unillustrated side structure 4 of the vehicle, while the internal portion 212 of the backrest cheek 210 is adjacent to the vehicle occupant 10. A drive device 7 in the form of an electric motor (not illustrated) or other linear actuator is arranged inside the stationary backrest portion 20. In the presence of appropriate sensor data, drive device 7 can drive the external part 211 toward the side structure 4 or toward the internal part 212. An airbag 9 is accommodated inside a housing 100 inside the backrest cheek 210 and is surrounded by a coupling element 8 and a carriage unit 11. The coupling element 8 can be attached to a seat frame 12. Alternatively, the external portion 211 of the backrest cheek 210 may be configured immobile.

FIG. 7 depicts the safety system in a state of alarm in which the sensor 5 detects a threatening side impact. The drive device 7 relocates the coupling element 8 forwards and toward the seat occupant 10 so that the internal portion 212 of the backrest cheek 210 fits the shoulder and couples the seat occupant 10 with the seat 1.

FIG. 8 depicts the safety system in a fully triggered state in which the external portion 211 of the backrest cheek 210 is moved into contact with the side structure 4 of the motor vehicle 1. When the sensor 5 senses an approaching object, the evaluation unit 6 communicates an appropriate command to the drive device 7 which moves the carriage unit 11 together with external portion 211, into the working position. In this position, the external portion 211 of the backrest cheek 210 is locked. The airbag 9, which had been located in a jacket 100, is triggered because of a side impact and deployed. The coupling element 8, to which the airbag 9 and housing 100 is fastened, has already been displaced toward the seat occupant 10 in advance of the impact by means of a rotation so that the internal portion 212 of the backrest cheek 210 moved toward the seat user 10. This rotation likewise steered the deployment direction of the airbag 9 towards the seat user 10. Alternatively, coupling element 8 may translate relative to seat frame 12 rather than rotate. A combination of rotation and translation movements is also possible.

Figure 9:
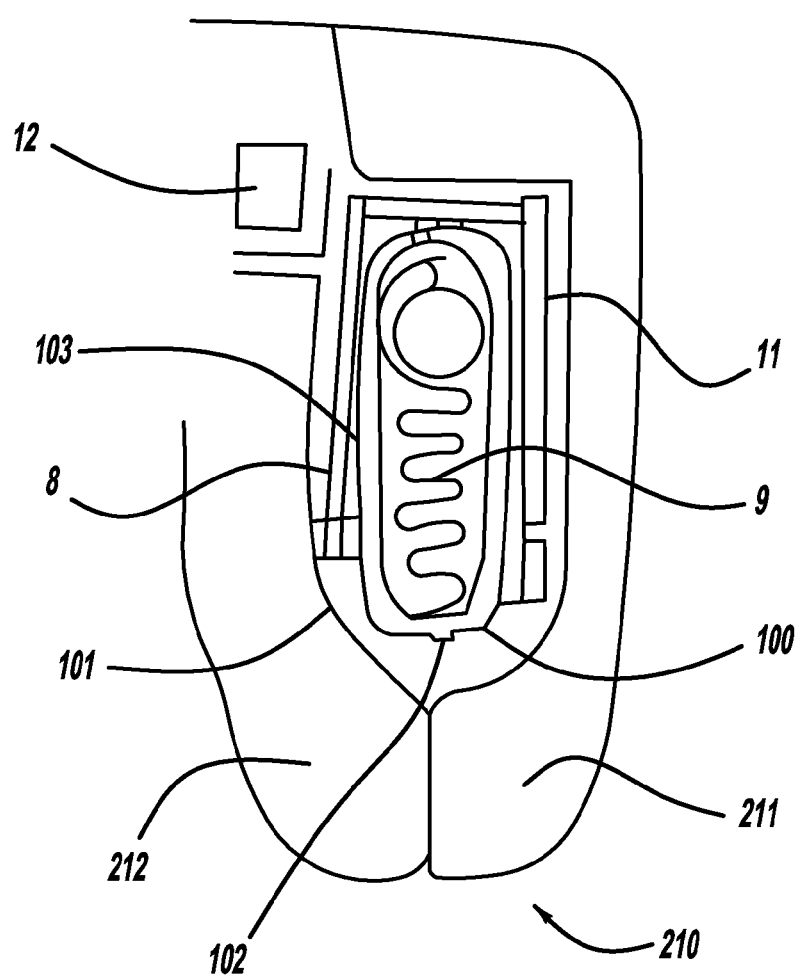
FIG. 9 is a detailed view of a backrest cheek having an energy absorbing element.

FIG. 9 depicts the safety arrangement in detail in an enlarged representation. In the closed state as per FIGS. 6 and 9, a housing 100, which is coupled to the carriage unit 11 and coupling element 8, surrounds the airbag 9. A clip on the coupling element 8 engages a recess 101 on the jacket 100. If the coupling element 8 in the backrest cheek 210 is driven inwards toward the seat user 10, then the upholstery of the backrest cheek 210 will open and form an open space 30. The housing 100 is likewise opened by the pivot motion in that the clip pulls a portion of the housing 100 and the recess 101 inwards and opens a lock 102 of the housing 100. This lock 102 is preferably configured as a reversible snap lock so that the housing 100 is re-locked in the event of a return movement of the coupling element 8 towards the external part 211 of the backrest cheek 210. As soon as the coupling element 8 has moved inwards and opened the housing 100, the airbag 9 can unfold very rapidly because it needs only to tear open a soft jacket 103 that still holds the airbag 9 in the folded state. This feature increases the unfolding speed of the airbag 9 and is advantageous for the safety of the seat user 10. If the airbag 9 is not triggered then, after a certain time period, the coupling element 8 will move out of the working position depicted in FIG. 7, return to the rest position depicted in FIG. 6, and re-close the housing 100.

The fitting arrangement depicted in FIGS. 6 to 9 of an airbag 9 inside a backrest cheek 210 can also be configured in a seat cushion cheek. To this end, the construction is very similar but rotated by about 90°.

As a person skilled in the art will readily appreciate, the above description is meant as an illustration of the implementation of the principals of this invention. This description is not meant to limit the scope or application of this invention, in that this invention is susceptible to modification, variation, and change without departing from the spirit of this invention, as defined in the following claims.

We claim:

1. A safety apparatus for a motor vehicle having a vehicle seat designed to support a vehicle occupant, comprising:
    a sensor for detecting an impending impact and capable of communicating data,
    an evaluation unit in communication with the sensor to receive the data for evaluation of the data for the impending impact,
    a drive device in communication with the evaluation unit; and
    a moveable coupling element operatively connected to the drive device, wherein the coupling element is movable by the drive device in response to the evaluation unit between a rest position within the seat and a working position and back to the original rest position within the seat again, the coupling element in the working position is displaced toward the occupant to couple the seat to the occupant for the impending impact and the coupling element moved back again to the rest position in response to the evaluation unit determining the impending impact did not occur, wherein the coupling element is moveable into the working position such that at least a portion of a seat cushion or a portion of a backrest of the seat is deformed towards the occupant for restraining relative movement of the occupant towards a side structure of the vehicle, and wherein the coupling element is configured as a support plate.

2. The safety apparatus of claim 1, wherein the coupling element is configured as an energy-absorbing element.

3. The safety apparatus of claim 1, wherein the coupling element is arranged in the rest position in the vehicle seat.

4. The safety apparatus of claim 1, wherein the coupling element is configured to move to the side structure of the vehicle so as to couple the seat to the side structure of the vehicle.

5. The safety apparatus of claim 1, wherein the coupling element is arranged in a seat cushion or a backrest of the seat.

6. The safety apparatus of claim 5, wherein the coupling element can be moved upwards in the vertical direction out of the seat cushion or forwards out of the backrest into the working position.

7. The safety apparatus of claim 1, wherein the coupling element while in the working position, remains within the seat cushion or within the backrest.

8. The safety apparatus of claim 1, wherein the coupling element is configured to couple the seat to the pelvic region or shoulder region of the occupant.

9. The safety apparatus of claim 1, wherein the support plate is coupled to an energy storage device or an energy conversion device.

10. The safety apparatus of claim 1, wherein an airbag is arranged in a seat cushion or a backrest portion of the seat.

11. The safety apparatus of claim 1, wherein the coupling element is mounted on a seat frame portion of the seat.

12. The safety apparatus of claim 1, wherein the sensor is configured as a radar sensor.

13. The safety apparatus of claim 1, wherein the drive device is configured as a reversibly operable electric motor or as a spring coupled to an electric motor.

14. The safety apparatus of claim 1, wherein the coupling element is disposed in the backrest of the seat and the backrest has a backrest cheek having an external portion facing the side structure of the vehicle and an internal portion adjacent to the occupant, the coupling element displacing the internal portion toward the occupant.

15. The safety apparatus of claim 14, wherein the coupling element further displacing the external portion toward the vehicle side structure to couple the seat with the side structure.

16. The safety apparatus of claim 14, wherein the seat backrest cheek forms a cavity between the internal and external portions, and an airbag is disposed in the cavity.

17. The safety apparatus of claim 16, wherein the displacement of the internal portion of the backrest cheek opens a pathway for the deployment of the airbag.

18. The safety apparatus of claim 1, wherein the coupling element in the working position laterally restrains the occupant to the seat.

19. The safety apparatus of claim 1, wherein the coupling element is configured to move transversely with respect to a direction of travel of the motor vehicle.

* * * * *